United States Patent [19]

Miyata

[11] Patent Number: 5,010,498

[45] Date of Patent: Apr. 23, 1991

[54] VIDEO PRINTER

[75] Inventor: Hidenobu Miyata, Tokyo, Japan

[73] Assignee: GFK GmbH, Nuremberg, Fed. Rep. of Germany

[21] Appl. No.: 414,509

[22] Filed: Sep. 29, 1989

[30] Foreign Application Priority Data

Oct. 4, 1988 [JP] Japan .................. 63-130354[U]

[51] Int. Cl.$^5$ .......................................... G06K 15/00
[52] U.S. Cl. .................................... 364/519; 358/442
[58] Field of Search ............................. 364/518–519, 364/930 MS, 235 MS; 346/154; 358/296, 442

[56] References Cited

U.S. PATENT DOCUMENTS

| 4,307,418 | 12/1981 | Mindel et al. | 358/296 |
| 4,467,371 | 8/1984 | Kobayashi et al. | 358/296 |
| 4,682,190 | 7/1987 | Ikeda | 346/154 |

FOREIGN PATENT DOCUMENTS

3738336A1  3/1989  Fed. Rep. of Germany ...... 358/296

OTHER PUBLICATIONS

"SSTV mit dem AIM-65", Herbert Muller, *Mikrocomputer*, Funkschau 1980, Heft 14.

Primary Examiner—Arthur G. Evans
Attorney, Agent, or Firm—Browdy and Neimark

[57] ABSTRACT

A video printer has a built-in display to avoid unnecessary external connections. Composite displays are formed by superposing an auxiliary video signal (e.g. from a character generator) on a main video signal. While the composite signal is being displayed, the printer prints out the image formed by the composite signal. Multi-frame pictures may be printed, as can pictures of varying resolution, depending on whether a frame or a field of the video signal is selected.

18 Claims, 7 Drawing Sheets

VIDEO PRINTER

This invention relates to a video printer for printing a video picture on a printing sheet.

BACKGROUND OF THE INVENTION

FIG. 2 shows the arrangement of a conventional video printer, in which a television set 2, for outputting a video picture which is to be printed, is connected to a video printer 1, which is connected in turn to a monitor television set 3 for monitoring a picture to be printed. The output video signal of the television set 2 is applied through the video printer 1 to the monitor television set 3, so as to be displayed thereon. Upon depression of a predetermined switch at a predetermined time instant, a video signal of one frame or one field is stored in a memory provided in the video printer. Simultaneously, the video signal applied to the monitor television set 3 is switched from the output of the television set 2 over to the output of the memory of the video printer, so that the picture stored in the memory is detected by the monitor television set 3. When another predetermined switch is depressed with a printing sheet placed in the video printer 1, the picture stored in the memory is printed out.

As is apparent from the above description, the conventional video printer requires both the monitor television set 3 and the television set 2 to be connected externally thereof. Therefore, the conventional video printer is disadvantageous in that the wiring connections are intricate, and the video printer and its peripheral devices occupy a relatively large space. Accordingly, it is not practical to use the conventional video printer together with a so-called audio-visual (AV) system; i.e., audio devices and video devices such as a video tape recorder and a video disc player. Since it is impractical to use the conventional video printer with a variety of audio-visual equipment, the conventional printer is greatly limited in its possible applications and configurations. Therefore, the conventional video printer's commercialization potential is negatively affected.

In view of the foregoing, an object of this invention is to provide a video printer which occupies a relatively small area even when combined with an AV system, and which can print out more than one picture in combination, thus having many additional values and features.

SUMMARY OF THE INVENTION

The foregoing and other objects of the invention have been achieved by the provision of a video printer which, according to the invention, includes: an input terminal to which a main video signal is applied; a memory for storing the main video signal applied to the input terminal; video signal generating means for generating an auxiliary video signal which is to be superposed on the main video signal; a composing circuit for combining the main and auxiliary video signals; a printer for printing an output of the composing circuit on a sheet; and display means for displaying an output of the composing circuit.

With the video printer of the present invention, the main video signal provided, for instance, by a television set is combined with the auxiliary video signal indicating a title, data, etc., to form a composite signal, which in turn is displayed on a relatively small display such as a liquid crystal display, while it is being printed out.

Thus, the video printer is small in size and produces prints with auxiliary information, thus providing more useful prints.

BRIEF DESCRIPTION OF THE DRAWINGS

The above and other objects, features, and advantages of this invention will become more apparent from the following detailed description when read in conjunction with the accompanying drawings in which.

DETAILED DESCRIPTION OF THE PREFERRED EMBODIMENT

Figure 3:
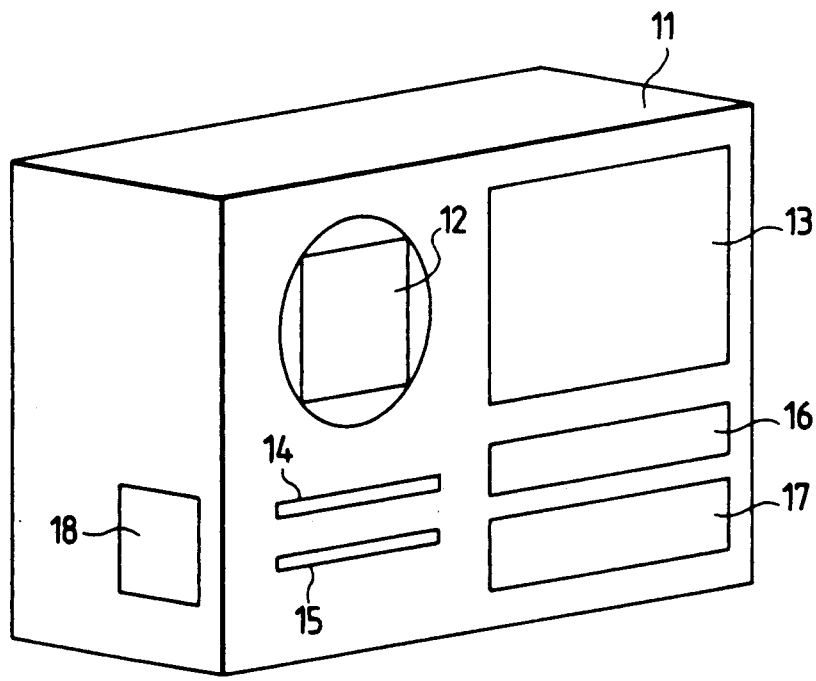
FIG. 3 is a perspective view of the video printer according to the invention.

One embodiment of a video printer according to the present invention is shown in FIG. 3, in which a housing 11 of metal or synthetic resin is provided with a display, such as a liquid crystal display unit 12, in the upper left portion of the front wall of the housing 11. Also provided on the front wall of the housing are a first input section 13 including switches for inputting predetermined data to a character generator built in the housing 11; a sheet inserting opening 14 into which a printing sheet is inserted for printing a picture; a sheet discharging opening 15 through which a printing sheet on which a picture has been printed is discharged; a display section 16 for displaying data concerning a printing operation; and a second input section 17 having switches for inputting data for a printing operation. A door 18 is provided on the left side wall of the housing 11, and is opened and closed in order to load and unload an ink film cassette.

Figure 4:
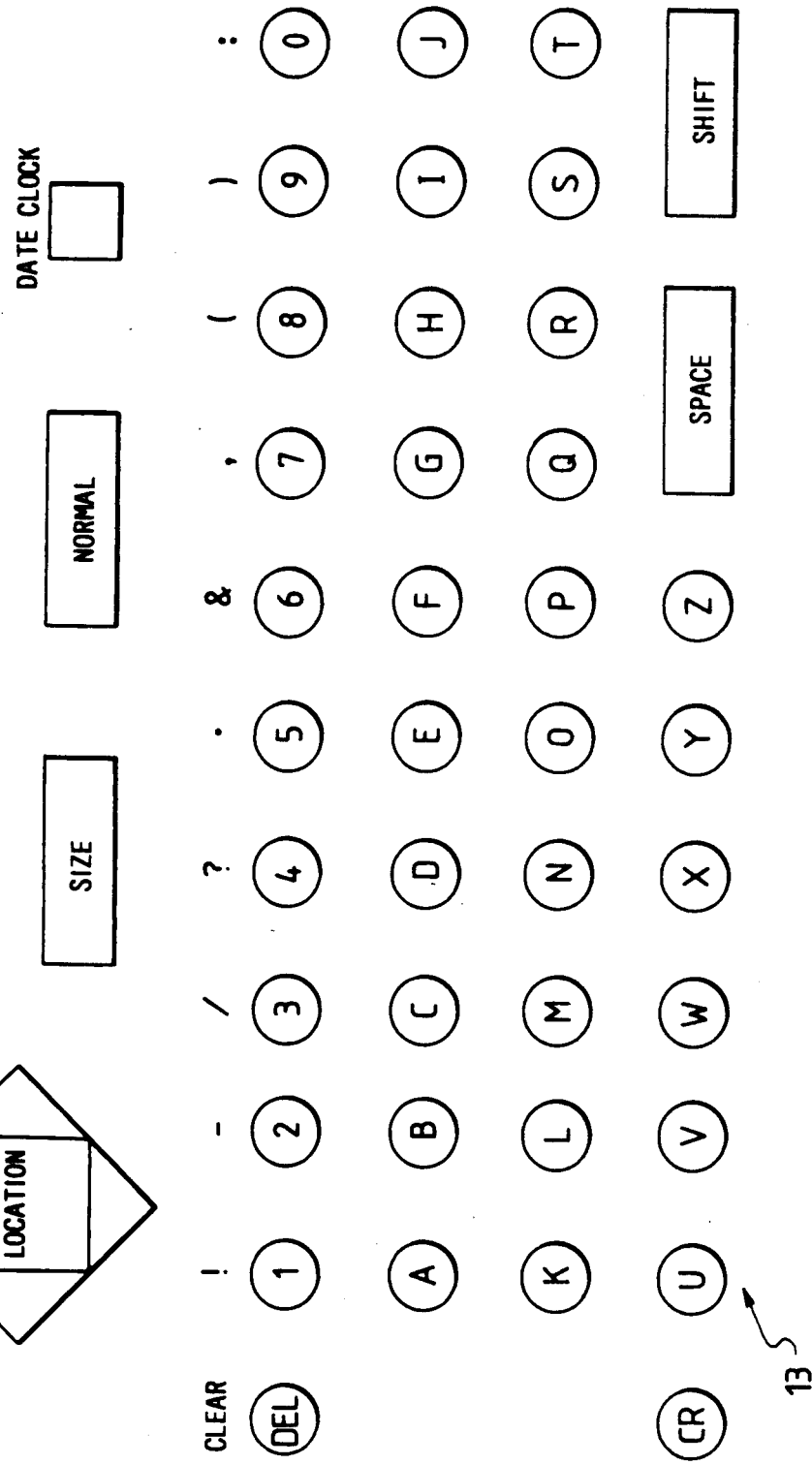
FIG. 4 is a front view showing the input section of a character generator in the video printer of the invention.

FIG. 4 shows an example of the first input section 13. Keys having figures "0" through "9" and alphabetical characters "A" through "Z" are depressed to input those figures and alphabetical characters, respectively. In order to input symbols or marks (such as "&" and "?") indicated on the keys, the appropriate keys are depressed together with a "SHIFT" key, just as with a typewriter. When a "SPACE" key is depressed, a space is interposed, for instance, between characters.

The size of the character or the like to be reproduced can be changed by depressing a "SIZE" key. When a "DEL" key is depressed, the character on the left side of the cursor shown on the display unit 12 is deleted. When the "DEL" key and the "SHIFT" key are depressed simultaneously, one title is deleted. A "CR" key is depressed for carriage return.

The cursor may be moved in the direction indicated by four triangular "LOCATION" keys indicating, upper, lower, right, and left directions by operated any of those.

A "DATE CLOCK" key is operated to display date and time. When a "NORMAL" key is depressed, all the displays (auxiliary video signals) provided by the character generator are erased and ordinary video signals (main video signals) are only displayed.

Figure 5:
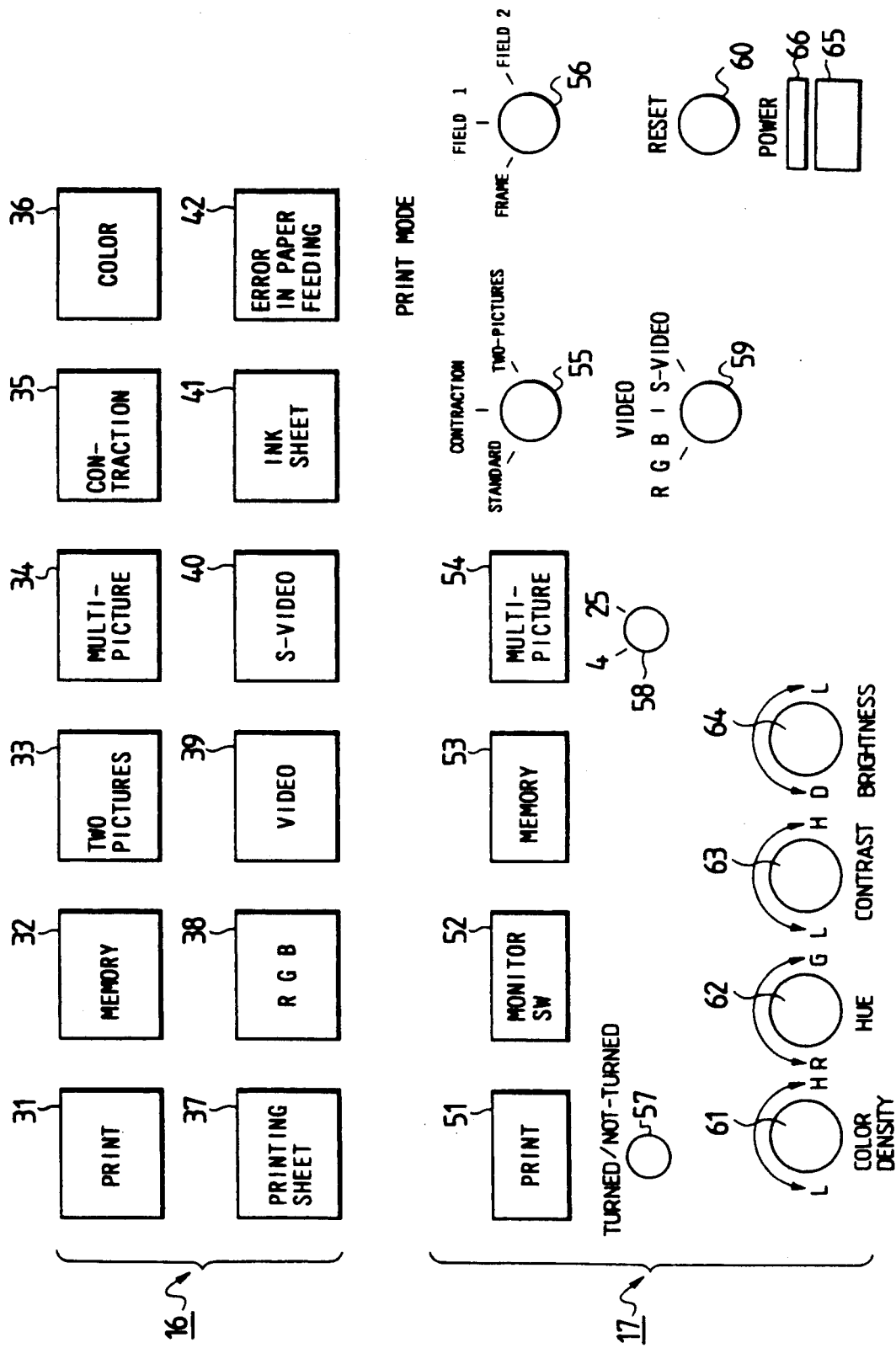
FIG. 5 is a front view showing a display section and an input section in the video printer of the invention.

FIG. 5 shows an example of the display section 16 and the second input section 17. A lamp 31 is turned on when a button 51 is depressed to start a printing operation. A lamp 32 is turned on when a picture stored in memory is displayed on the liquid crystal display unit 12. Lamps 33 and 35 are illuminated when a switch 55 is positioned to "TWO PICTURES" and "CONTRACTION", respectively. A lamp 34 is turned on when a stored multi-picture is displayed by depressing a button 54 a predetermined number of times. A lamp 36 is illuminated when a color printing operation can be started with a color ink film cassette loaded in the printer. A lamp 37 is turned on when a printing sheet (or print paper) can be inserted into the sheet inserting opening 14. Lamps 38, 39, and 40 are turned on when a switch 59 is positioned to "RGB", "VIDEO", and "S VIDEO", respectively. A lamp 41 is a warning lamp which is turned on when the ink film (sheet) has been used up, or the door 18 has been opened. A lamp 42 also is a warning lamp which is turned on when the print paper is caught in the sheet conveying mechanism.

A button 52 is operated to switch the picture displayed on the liquid crystal display unit 12 from a picture stored in memory to an externally-input picture, and vice versa. The switch 55 is operated to switch the print mode over to a standard mode, a contraction mode, or a two-picture mode. A switch 56 is operated to switch the print mode over to a frame mode, a field-1 mode, or a field-2 mode. A switch 57 is operated in order to print the picture which is obtained by turning its original picture 180° about its vertical axis. In displaying a multi-picture on the display unit 12, a switch 58 is operated to set the desired number of pictures to be four (4) or twenty-five (25). A button 60 is depressed to pause a printing operation or to release the warning lamps. Knobs 61 through 64 are operated to adjust printing conditions, and are turned clockwise or counterclockwise to adjust color density, hue, contrast, and brightness, respectively. A button 65 is operated to turn the power source on and off. When the power source is turned on, lamp 66 is turned on.

Figure 6:
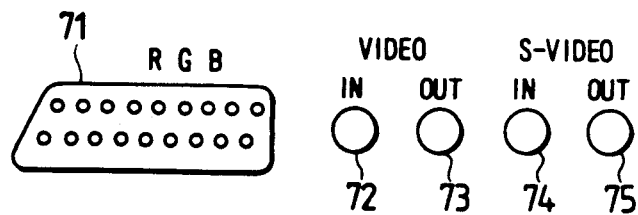
FIG. 6 is an explanatory diagram showing input and output terminals of the video printer of the invention.

FIG. 6 shows one example of the input/output terminals provided on the rear wall of the housing 11. In FIG. 6, reference numeral 71 designates a terminal to which RGB video signals are applied; 72 represents a terminal to which ordinary video signals are applied; 73 designates a terminal through which ordinary video signals are outputted; 74 represents a terminal to which high-picture-quality S video signals are applied; and 75 designates a terminal through which high-picture-quality S video signals are outputted.

Figure 7:
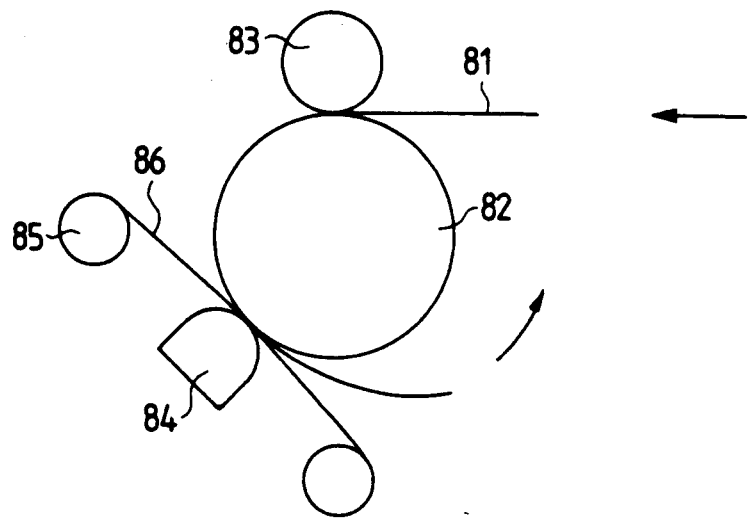
FIG. 7 is a diagram for describing the operating principle of a printing mechanism in the video printer according to the invention.

FIG. 7 is a diagram for describing the operating principle of a printing mechanism built into the housing 11. A print paper 81 inserted through the sheet inserting opening 14 is moved along a platen 82 counterclockwise in FIG. 7 while being held between the platen 82 and a pressure roller 83. A thermal head 84 pushes the print paper 81 against the platen 82 through an ink film 86 fed from an ink film cassette 85. Data on a video picture to be printed are applied to the thermal head 84. The ink film 86 has regions coated with the three-primary-colors (yellow, magenta, and cyan) transfer ink, and a printing operation is performed for each of the three primary colors. As a result, a printing operation is performed three times for the print paper 81. Whenever the print paper is printed in a primary color, the print paper 81 is moved in the opposite direction. When the print paper 81 has been printed in the three primary colors, it is moved counterclockwise, and finally is discharged through the sheet discharging opening 15.

Figure 1:
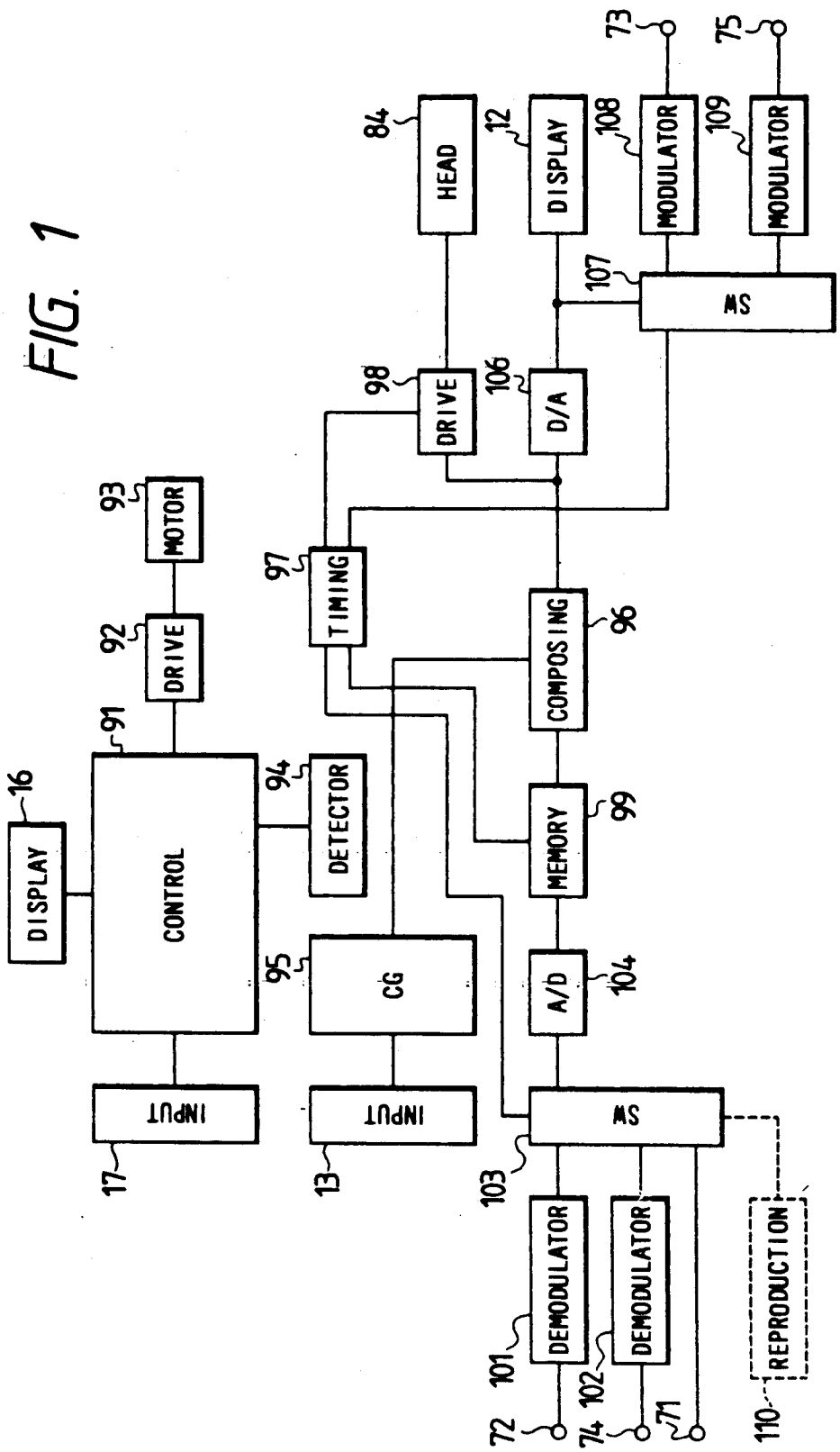
FIG. 1 is a block diagram showing the arrangement of a video printer according to the present invention.
Figure 2:
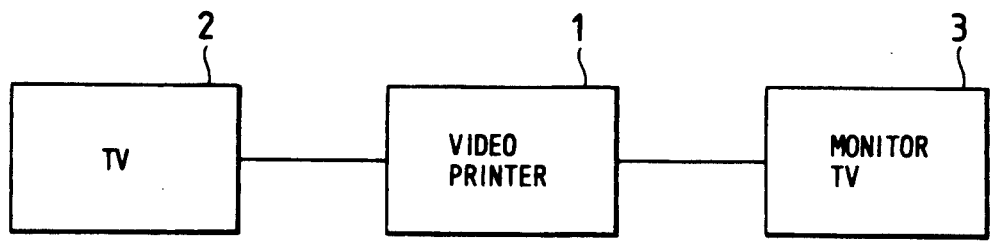
FIG. 2 is a block diagram showing the arrangement of a conventional video printer.

In FIG. 1, which is a block diagram showing the arrangement of the video printer according to the present invention, a control circuit 91, including a microcomputer or the like, controls the printing operation. A drive circuit 92 drives an electric motor 93 under control of the control circuit 91, the motor 93 in turn driving a platen 82, etc. to convey a print paper 81 along a sheet conveying path. A detector 94 detects the insertion and position of a print paper 81 and the opening and closing of the door 18, and applies detection signals to the control circuit 91. A video signal generator 95, such as a character generator, generates a predetermined video signal (or auxiliary video signal) in response to a signal received through the input section 13. A composing circuit 96 combines the output video signal of the character generator with a video signal (or main video signal) provided through a terminal 71, 72, or 74. A timing signal generating circuit 97 produces timing signals to control a drive circuit 98 adapted to drive a thermal head 84, a memory 99 adapted to store the main video signal, and switches 103 and 107 adapted to select a signal.

Further in FIG. 1, demodulator circuits 101 and 102 demodulate video signals applied through the terminals 72 and 74, respectively. In association with the operation of the switch 59, the switch 103 selects one of the video signals inputted through the terminals 71, 72, and 74, and the selected video signal is applied through an analog-to-digital (A/D) converter 104 to the memory 99. The output of the memory 99 is supplied to the composing circuit 96, which outputs a composite signal. The composite signal is applied through the drive circuit 98 to the thermal head 84 and through a digital-to-analog (D/A) converter 106 to the liquid crystal display unit 12. In association with the positioning of switch 59 to "VIDEO" or "S VIDEO", a switch 107 applies the input signal to a modulator circuit 108 or a modulator circuit 109. The modulator circuits 108 and 109 modulate the video signals, and input the video signals thus modulated to terminals 73 and 75, respectively. When the switch 59 is positioned to "RGB", the memory 99 is controlled to transmit the output signal of the A/D converter 104 as it is. In this case, the output signal thus transmitted is applied to the thermal head 84 and the liquid crystal display unit 12 (not to the terminals 73 and 75).

Looking at this operation in greater detail, for instance, in order to print in response to the video signal applied to the terminal 72, the switch 59 is positioned to "VIDEO". After being demodulated by the demodulator circuit 101, the video signal applied to the terminal 72 is supplied through the switch 103 to the A/D converter 104, where it undergoes analog-to-digital conversion. The output signal of the A/D converter 104 is applied to the memory 99. Until reception of a storage instruction, the memory 99 transmits a signal applied thereto, as it is. Therefore, the video signal passes through the memory 99 and is applied, as it is, through the composing circuit 96 to the D/A converter 106, where it undergoes D/A conversion. The output signal of the D/A converter 106 is supplied to the liquid crystal display unit 12, so as to be displayed as a picture thereon. Accordingly, the video signal applied through the terminal 72 is monitored.

In the video printer of the invention, the liquid crystal display unit 12 is mounted on the housing 11. Accordingly, it is unnecessary to connect an external monitoring television set to the video printer, and hence the output terminal 73 may be eliminated. However, if the output terminal 73 is not eliminated, then an external monitoring unit still may be connected to it.

When finding a picture on the display unit 12 which is to be printed out, the operator depresses the button 53, in response to which the control circuit 91 controls the memory 99 with the aid of the timing signal generating circuit 97 so that the memory 99 stores the video signal applied thereto through the A/D converter 104 at that time instant. During this operation, if the switch 56 is positioned to "FRAME", then one frame of the video signal of one frame is stored. Alternatively, if the switch 56 is positioned to "FIELD 1", then one odd-numbered field of the video signal is stored. Lastly, if the switch 56 is positioned to "FIELD 2", then one even-numbered field of the video signal is stored. When the picture is of high-speed motion, and it is required to print the picture without blurriness, the switch should be positioned to "FIELD 1" or "FIELD 2". However, it should be noted that the picture will be printed out with higher resolution when the switch is positioned to "FRAME".

The memory 99 is so controlled as to output the stored video signal. As a result, the still picture stored in the memory 99 is displayed on the liquid crystal display unit 12. Simultaneously, the control circuit 91 operates to turn on the lamp 32. Then, the operator, confirming that the lamp 32 has been turned on, inserts a print paper 81 into the sheet inserting opening 14, and depresses the button 51. In response to the depression of the button 51, the control circuit 91 operates to turn on the lamp 31 and to drive the motor 93 via the drive circuit 92, so that the platen 82 is rotated to convey the print paper 81 along the predetermined printing path. The data stored in the memory 99 is applied through the drive circuit 98 to the thermal head 84, thus being printed on the print paper 81. The printing operation is performed by using the three primary colors, and the resultant picture is a color picture. After the printing operation, the control circuit 91 operates to turn the platen 82 in the predetermined direction to discharge the print paper 81 through the sheet discharging opening 15.

Figure 8:
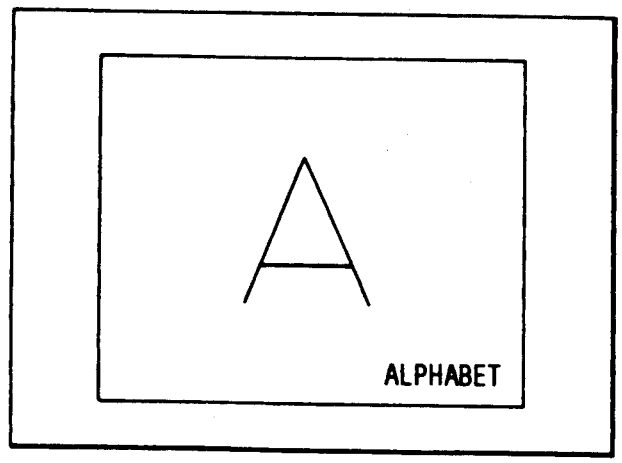
FIG. 8 is an explanatory diagram showing an ordinary print provided by the video printer of the invention.

As described above, in response to the operation of the input section 13, the character generator outputs a video signal of data, time, or title. The output video signal is applied to the composing circuit 96, where it is combined with the output video signal of the memory 99, to provide a composite signal which is applied to the liquid crystal display unit 12 and the thermal head 84. Therefore, with the video printer of the present invention, a picture on which characters, symbols, etc. have been superposed, a composite picture can be printed out after being confirmed by the monitor. One example of the composite picture is shown in FIG. 8. In this case, a main picture of the character "A" and an auxiliary picture of the title "ALPHABET" are printed out.

If a video signal is stored in the memory 99, then it will be deteriorated. In order to overcome this difficulty, the video signal of a still picture may be applied to the terminal 72. In this case, it is unnecessary to store the video signal in the memory; that is, it can be printed out directly. In other words, instead of depressing button 53, button 51 is depressed.

When a multi-picture including four pictures is required to be printed out, the switch 58 first is positioned to "4 PICTURES", and the button 54 is depressed with predetermined timing. As a result, the lamp 34 is turned on, and the picture $B_1$ at that time instant is stored in the memory 99. In this operation, the data is stored with a part omitted so that the size of the picture is about a quarter ($\frac{1}{4}$) of that of an ordinary picture (as shown in FIG. 8). Simultaneously, the lamp 31 is turned on, and the picture $B_1$ stored in the memory is displayed on the displayed unit 12 at the upper left part of the screen. The button 52 is depressed so as to display on the liquid crystal display unit 12 the signal provided through the terminal 72 instead of the signal provided by the memory 99, and the button 54 is depressed for a predetermined time and the next picture $B_2$ is stored in the memory 99. Similarly, the remaining pictures $B_3$ and $B_4$ are stored in the memory 99. Under this condition, the printing operation is performed. As a result, the multi-picture including the four pictures $B_1$ through $B_4$ as shown in FIG. 9(a) is printed out.

Figures 9A, 10A:
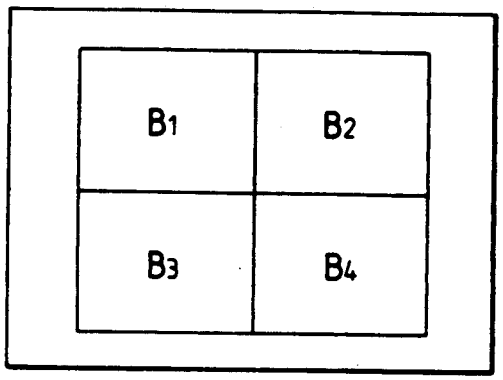
FIG. 9, consisting of 9(a) and 9(b), is an explanatory diagram showing a multi-picture having four pictures which is printed out with the video printer according to the invention.
FIG. 10, consisting of 10(a) and (b), is an explanatory diagram showing a multi-picture consisting of twenty-five pictures which is printed out with the video printer of the invention.

When the switch 58 is positioned to "25 PICTURES", a multi-picture including twenty-five (25) pictures as shown in FIG. 10(a) is stored and printed out.

Figures 9B, 10B:
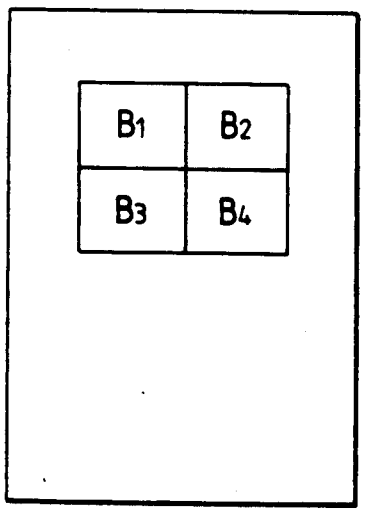

When the switch 55 is positioned to "CONTRACTION", as shown in FIG. 9(b), a multi-picture consisting of four pictures can be printed smaller in size. Similarly, a multi-picture consisting of twenty-five picture can be printed smaller, as shown in FIG. 10(b).

Figure 11:
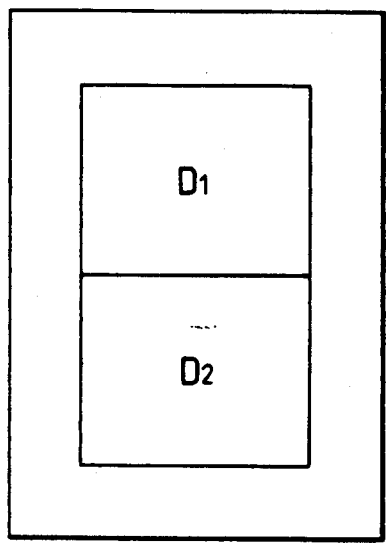
FIG. 11 is an explanatory diagram showing a two-picture print provided by the video printer according to the invention.
Figure 12A:
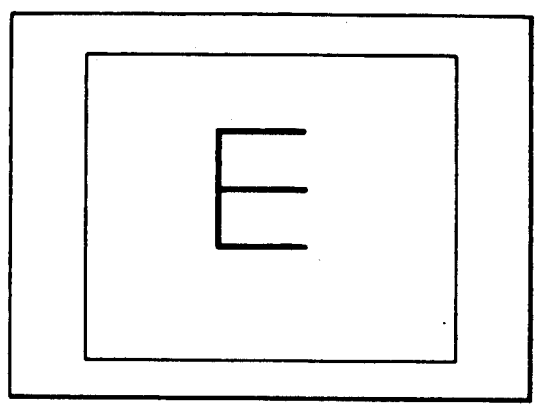
FIG. 12, consisting of 12(a) and 12(b), is an explanatory diagram showing an inversion print provided by the video printer of the invention.
Figure 12B:
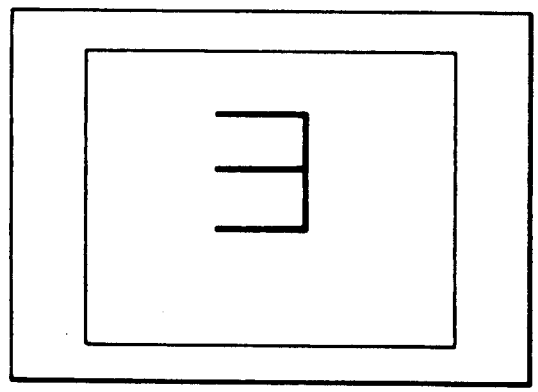

When the switch 55 is positioned to "2 PICTURES", the picture which is stored in the memory 99, or the picture which is inputted as a still picture and which is not stored in the memory 99 is printed out in the form of two pictures as shown in FIG. 11. If, in this case, the switch 56 is positioned to "FRAME", then the upper and lower pictures $D_1$ and $D_2$ will be the same. The two pictures $D_1$ and $D_2$ can be made different by positioning the switch 56 to "FIELD 1" and "FIELD 2" to store the pictures, and then performing the printing operation. When the switch 57 is positioned to "INVERSION", the control circuit 91 operates to control the drive circuit 98 so as to print out the picture which is obtained by turning its original picture 180° about its vertical axis. More specifically, in this case, the picture which is normally printed out as shown in FIG. 12(a) will be printed out as shown in FIG. 12(b).

When the detector 94 detects the jamming of the print paper 81 in the sheet conveying path, the control circuit 91 operates to turn on the lamp 42. In this case, the operator depresses the button 65 to turn off the power source, and opens the door 18 to unload the cassette 85, and removes the print paper 81 thus caught in the sheet conveying path. Thereafter, the cassette 85 is loaded, and the door 18 is closed. Under this condition, the power source is turned on, to operate the video printer.

The operation of the video printer has been described hereinbefore with reference to the case where the switch 59 is set to "VIDEO". When the switch 59 is set to "S VIDEO", the video printer operates similarly to when the switch 59 is positioned to "VIDEO", except that the demodulator circuit 102 and the modulator circuit 109 are used. When the switch 59 is positioned to "RGB", a video signal cannot be stored in the memory 99, and therefore it is necessary to input a video signal as a still picture.

The terminal 72 may be connected to a television set, television tuner, video disc player, still video unit, visual telephone set, or an optical disc unit. Further, the switch 103 may be connected to a terminal to which a video signal is applied by a computer. In addition, the video printer may be so modified so that a reproduction device 110 for reproducing video signals from a recording medium (or storing medium) such as a magnetic disc, optical disc, photo-magnetic disc, magnetic tape, or solid state memory in which video signals have been recorded is built into the housing 11, and the output of the reproduction device 10 is selected by the switch 103.

As was described above, the video printer of the invention has the monitoring display and the auxiliary video signal generator built in. Therefore, the video printer combined with an AV system occupies a relatively small area, and can print out commercially viable pictures with high utility.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A video printing device having a housing and comprising therein:
   input means adapted to receive main video signals;
   memory means connected to said input means, for selectively storing one of said main video signals and a portion thereof;
   video signal generating means for generating auxiliary video signals;
   composing circuit means connected to said memory means and to said video signal generating means, for receiving and selectively composing said main video signals and said auxiliary video signals;
   display means connected to said composing circuit means for display information according to output signals of said composing circuit means;
   printing means connected to said composing circuit means for printing information according to the output signals thereof; and
   mode selection means connected to said memory means and operable between a passing mode condition in which said memory means is switched so as to be inoperative and said composing circuit means receive said main video signals from said input means without temporary storage in said memory means, and a second mode condition in which said memory means is switched so as to operative and said composing circuit means receive main video signals stored in said memory means.

2. The video printing device as claimed in claim 1, wherein said mode selection means is constituted by a manually operable switch.

3. The video printing device as claimed in claim 1, further comprising reset means connected to said memory means, for erasing video signal information stored in said memory means, and for resetting said memory means to its original state.

4. The video printing device as claimed in claim 1, wherein said input means comprises input terminals adapted to receive, respectively, at least one of still picture video signals RGB video signals, ordinary video signals, and high picture quality S video signals.

5. The video printing device as claimed in claim 1, further comprising picture selecting means for selecting, for the purpose of at least one of storage, display, and printing, video signals according to one of the total information of a picture and of a portion thereof.

6. The video printing device as claimed in claim 1, wherein said information received from said composing circuit means is displayed by said display means while said printing means prints said information.

7. The video printing device as claimed in claim 1, wherein said display means comprises a liquid crystal display unit.

8. The video printing device as claimed in claim 1, further comprising multi-picture means for forming a plurality of images in said composing circuit means.

9. The video printing device as claimed in claim 1, further comprising a motor for driving said printing means, and a control unit for controlling said motor.

10. The video printing device as claimed in claim 1, further comprising manually settable means having arrays thereof, and wherein a display screen of said display means, input and output stations of said printing means for input and out of a printing material, and said arrays for said manually settable means are disposed on a front surface of said housing.

11. The video printing device as claimed in claim 2, further comprising manually settable means having arrays thereof, and wherein a display screen of said display means, input and output stations of said printing means for input and output of a printing material, and said arrays for said manually settable means are disposed on a front surface of said housing.

12. The video printing device as claimed in claim 3, further comprising manually settable means having arrays thereof, and wherein a display screen of said display means, input and output stations of said printing means for input and output of a printing material, and said arrays for said manually settable means are disposed on a front surface of said housing.

13. The video printing device as claimed in claim 4, further comprising manually settable means having arrays thereof, and wherein a display screen of said display means, input and output stations of said printing means for input and output of a printing material, and said arrays for said manually settable means are disposed on a front surface of said housing.

14. The video printing device as claimed in claim 5, further comprising manually settable means having arrays thereof, and wherein a display screen of said display means, input and output stations of said printing means for input and output of a printing material, and said arrays for said manually settable means are disposed on a front surface of said housing.

15. The video printing device as claimed in claim 6, further comprising manually settable means having arrays thereof, and wherein a display screen of said display means, input and output stations of said printing means for input and output of a printing material, and said arrays for said manually settable means are disposed on a front surface of said housing.

16. The video printing device as claimed in claim 7, further comprising manually settable means having arrays thereof, and wherein a display screen of said display means, input and output stations of said printing means for input and output of a printing material, and said arrays for said manually settable means are disposed on a front surface of said housing.

17. The video printing device as claimed in claim 8, further comprising manually settable means having arrays thereof, and wherein a display screen of said display means, input and output stations of said printing means for input and output of a printing material, and said arrays for said manually settable means are disposed on a front surface of said housing.

18. The video printing device as claimed in claim 9, further comprising manually settable means having arrays thereof, and wherein a display screen of said display means, input and output stations of said printing means for input and output of a printing material, and said arrays for said manually settable means are disposed on a front surface of said housing.

* * * * *